United States Patent [19]

Dickson, Sr.

[11] 4,229,832
[45] Oct. 28, 1980

[54] DIVER'S SUIT EXCESS GAS EXHAUST VALVE

[75] Inventor: Charles H. Dickson, Sr., Panama City, Fla.

[73] Assignee: The United States of America as represented by the Secretary of the Navy, Washington, D.C.

[21] Appl. No.: 41,037

[22] Filed: May 21, 1979

[51] Int. Cl.³ .............................................. A62B 17/00
[52] U.S. Cl. ................................. 2/2.1 R; 128/201.28; 137/854; 137/81.2
[58] Field of Search ............................ 2/2.1 R, 2.1 A; 137/DIG. 9, 81 A, 512, 512.3, 522, 523, 854; 128/201.28, 205.24, 207.12; 9/319; 405/186

[56] References Cited

U.S. PATENT DOCUMENTS

| | | | |
|---|---|---|---|
| 2,404,020 | 7/1946 | Akerman | 128/201.28 X |
| 2,417,177 | 3/1947 | Richou | 2/2.1 R |
| 2,593,988 | 4/1952 | Cousteau | 128/201.28 X |
| 3,024,465 | 3/1962 | Bould | 2/2.1 R |
| 3,342,200 | 9/1967 | Wilcox | 137/512.3 X |
| 3,473,849 | 10/1969 | Smith et al. | 137/512.3 X |
| 3,610,273 | 10/1971 | Russell | 137/854 |
| 3,636,966 | 1/1972 | Aldrich et al. | 137/81 A |
| 3,973,588 | 8/1976 | Holst | 137/854 |

Primary Examiner—H. Hampton Hunter
Attorney, Agent, or Firm—Richard S. Sciascia; Harvey A. David

[57] ABSTRACT

A valve for controlling venting of excess gas from a diving suit includes a valve body housing first and second rubber check valves arranged in series. A control knob is rotatable on the valve body to selectively open or close outlet ports for venting gas from between the check valves and to actuate a member to selectively either hold the first check valve closed or to allow it function.

12 Claims, 3 Drawing Figures

DIVER'S SUIT EXCESS GAS EXHAUST VALVE

BACKGROUND OF THE INVENTION

This invention relates to valves used with diving suits, and more particularly to an improved valve for controlling the release of excess quantities of gas from within a diving suit.

Some diving suits, of the type known as dry suits because they are intended to keep the diver dry, are designed to utilize a portion of the diver's pressurized breathing gas supply to provide a thermally insulating layer of gas between the diver's body and the inner surface of the suit, or between inner and outer walls of a suit having a double wall construction. This is accomplished by diverting some of the breathing gas into the body portion of the suit until the layer of gas therein is at a pressure substantially at or slightly above the ambient water pressure. The gas is usually air but may comprise other breathable gas mixtures. For convenience, the term air as used hereinafter will be understood to include any such mixtures.

While the layer of entrapped air provides a significant degree of useful thermal insulation to the diver, it expands in volume as the diver moves from deeper depths to shallower depths, due to the attendant decreases in ambient pressure. This expansion increases the total buoyancy of the diver's suit, thereby tending to cause the diver to rise further to a still shallower depth, and in turn causing further expansion of the air and increase in suit buoyancy. With no provision for venting excess air as a diver moves to shallower depths, the diver would tend to rise at an unsafe ascent rate. Too rapid ascent of the diver can result in serious physiological problems.

A variety of early diving suits have incorporated simple rubber check valves of disc or flapper type for venting of excess suit gas during ascent or change in attitude. Examples of these are found in U.S. Pat. No. 2,593,988 of J. Y. Cousteau and U.S. Pat. No. 3,024,465 of G. Bould. Those valves, however, are subject to being forced inwardly of their seats in the event increases in suit pressure do not adequately follow increases in ambient pressures, such as during a rapid, even momentary descent.

Presently, suit exhaust valves having the primary purpose of controlling the release of excess air during ascent as opposed to exhaust valves for discharging expired air, are designed for either of two different operational modes. The most common mode is for the diver to vent the excess air by depressing an exhaust valve actuator by hand so as to relieve the force of an internal spring sufficiently to permit the valve to be opened by the excess pressure of the internally trapped air. As long as the diver holds the actuator depressed the excess air escapes, until the internal air pressure is substantially reduced to the ambient water pressure at which time a safety one-way valve feature prevents water from entering the suit. A second type of valve in current use differs in operation in that the diver pulls a tether to hold a valve open against the pressure of an internal spring to allow the excess air to escape. This type of valve does not have the one-way safety valve feature and, if the diver fails to release the tether soon enough, water will enter the suit when excess air has been released and the suit will not remain dry.

One of the major disadvantages of either of the above operational modes is the requirement of the diver to manually operate the valve throughout his ascent, thereby precluding use of one hand for other important purposes. Another shortcoming of the known valves for the purpose is the use of springs to hold the valve closed when released. Spring actuated devices are notoriously unreliable in the environments of mud, sand and silt common to diving work. Additionally, manually depressible buttons and pull tethers are often difficult to manage with a heavily gloved or mittened diver's hand.

SUMMARY OF THE INVENTION

With the foregoing in mind, it is a principal object of this invention to provide an improved valve for retaining a predetermined volume of air as a thermal insulation layer within the body portion of a diver's suit and for controlling the exhaust or release of excess air from that layer when the diver ascends from a deeper depth to a more shallow depth.

Another object of this invention is the provision of an improved suit exhaust valve for the foregoing purposes and which does not require continuous manual commitment during an ascent.

Still another object is the provision of a suit venting control valve that is operated between a positive closed position and a venting position by a simple rotational movement through a partial turn of a large, easily grasped knob.

Yet another object is the provision of a diver's suit exhaust or vent control valve of the foregoing character and that requires only a momentary actuation at the beginning of an ascent, operates to release excess gas during the ascent, and automatically excludes water when ascent is terminated and excess air has been vented, after which the valve can be locked in a closed condition with a simple partial turn of its control knob.

The invention may be further said to reside in certain novel combinations, arrangements, and associations of parts which cooperate to achieve the foregoing objects and advantages, as well as others which will become apparent from the following description of a preferred exemplary embodiment when read in conjunction with the accompanying sheet of drawings.

DESCRIPTION OF THE PREFERRED EMBODIMENT

Figure 1:
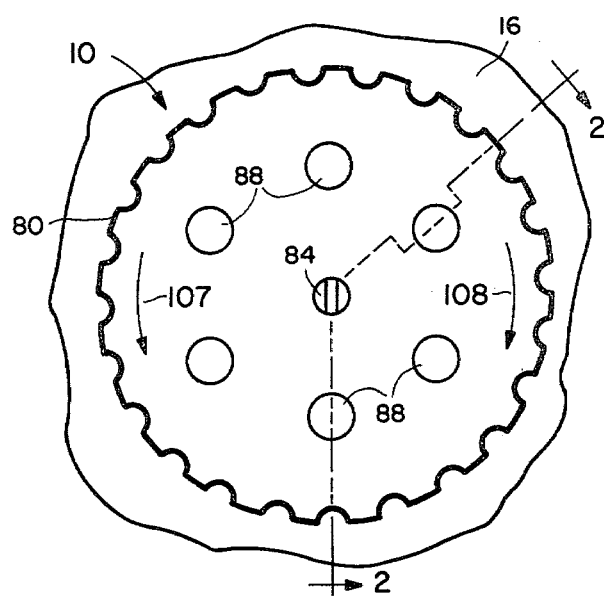
FIG. 1 is a front elevation of a diver's suit excess gas exhaust valve embodying the invention.
Figure 3:
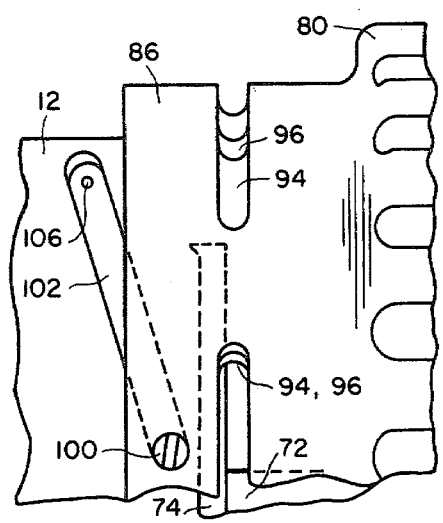
FIG. 3 is a fragmentary side elevational view as seen substantially along line 3—3 of FIG. 2.
Figure 2:
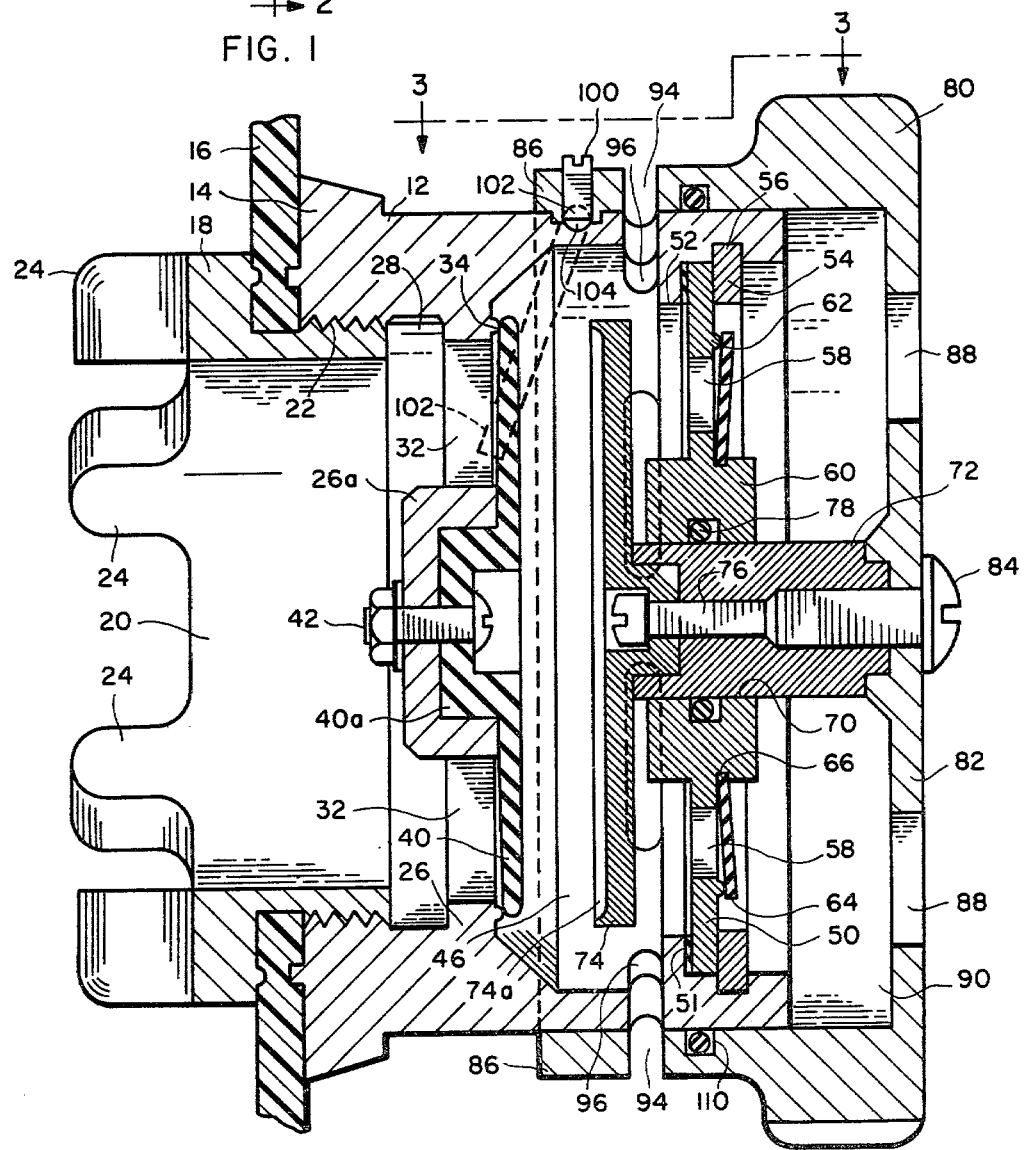
FIG. 2 is an enlarged sectional view of the valve of FIG. 1 taken substantially along line 2—2 thereof.

In the embodiment of the invention illustrated in the drawings and described hereinafter, a diver's suit excess gas exhaust valve indicated generally at 10, comprises a hollow, substantially cylindrical body 12 formed of a rigid, corrosion resistant material such as aluminum, or a plastic such as "DELRIN".

The body 12 has its inner or proximal end portion 14, relative to the diver, adapted to engage the outer surface of a flexible wall 16 of a diver's dry type suit, and to be held in sealing engagement around on opening in the suit wall by a tubular clamping nut 18. The nut extends through the opening from the interior of the suit wall and into threaded engagement with internal threads 22 of the valve body. The nut 18 has a central opening 20 providing an air passage into the interior of the body 12 and is provided with axial castellations 24 which serve both as abutments for wrench means to tighten the nut and as stand-off means to prevent obturation of the air passage by the diver's body or by an inner suit wall, if used.

The body 12 is provided with a transverse wall 26 that defines one end of an inlet cavity or chamber 28. The wall 26 has a plurality of passages or openings 32 therethrough, which openings are arranged about a central portion 26a of the wall 26 that is offset toward the inlet chamber 28 and defines a circular recess on the outwardly facing side of the wall 26. An annular, axially extending rib 34 is provided on the outwardly facing side of the wall 26, the rib encircling the openings 32 and serving as a valve seat for the peripheral portions of a resiliently flexible rubber check valve element 40.

The valve element 40 is substantially disc-shaped and comprises a central hub portion 40a snugly received in the recess formed by the wall portion 26a, and secured therein by a screw or bolt 42. The edges of the check valve element are adapted to flex, as shown in dot and dash lines, toward the distal or outer end of the valve body 12 into a cavity or chamber 46 defined therein between the wall 26 and a circular plate 50 that is disposed against a gasket 51 on a radially inwardly directed flange 52 and held by a retaining ring 54 engaged in a groove 56. The plate 50 has a plurality of openings 58 therethrough arranged around a central boss 60. An axially extending annular rib 62 on the outwardly facing side of the plate 50 encircles the openings 48 and serves as a seat for the peripheral edge portion of a resiliently flexible secondary rubber check valve element 64. The valve element 64, which is annular in shape, has its inner edge engaged in a groove 66 in the boss 60.

The boss 60 of the plate 50 has a central axial bore adapted to rotatably and slidingly receive an axial stem 72, the inner end of which carries a disc-shaped valve sealing plate 74. The plate 74, which is secured to the stem by a screw 76, is slightly larger in diameter than the rubber check valve element 40 and is adapted to be moved into and out of confining engagement with that valve element. To this end the plate 74 conveniently has an axially directed peripheral flange 74a adapted to pass over the free edge of the valve element 40. An O-ring 78, recessed into the boss 60, provides a sliding seal between the stem 72 and the plate 50.

Movement of the stem 72 and the sealing plate 74 toward and away from the valve element 40 is effected manually through the agency of a hollow control knob 80 having an end wall 82 that is fixed by a screw 84 to the outer end of the stem, and a cylindrical side wall 86 that rotatably and slidably encompasses the distal end portion of the valve body 12. The knob 80 is provided with openings 88 in the end wall 82 placing the zone or space 90 between that wall and the plate 50 continuously in communication with the ambient water medium, when in use. The knob is further provided with a plurality of circumferential, arcuate ports or slots 94 through the side wall portion 86, which slots are adapted to be in registration with a like plurality of ports or slots 96 opening through the side wall of the valve body 12 from the chamber 46.

Movements of the knob 80, and hence of the valve sealing plate 74, are guided by cooperation of a screw or pin 100, in the side wall 86 of the knob 80, with the side walls of a helical groove 102 in the outer surface of the valve body 12. A spring biased ball plunger 104 is carried by the pin 100 and is adapted to engage indentations 106 at opposite ends of the groove 102 and serve as a detent to releasably hold the knob against inadvertent rotations. When the knob 80 has been rotated in the direction of the arrow 107 of FIG. 1 to the limit of the groove 102 to its illustrated position relative to the body 12, the sealing plate 74 is retracted from the valve element 40, and the slots 94, 96 are in full registration. This is the "open" operative position of the valve 10. When the knob 80 is rotated in the direction of the arrow 108 to the limit of the groove 102, an angular distance of about 60°, the plate 74 is brought to confining engagement with the valve element 40 and the slots 94 are moved out of registration with the slots 96. This is the "closed" operative position of the valve 10.

An O-ring 110 is carried in an internal groove of the knob 80 and is slidable on the outer surface of the valve body 12. When the knob 80 is in the valve open position, the O-ring 110 is positioned as illustrated on the distal side of the slots 96. When the knob is operated to the valve closed position, the O-ring 110 moves to the proximal side of the slots 96, thereby forming a seal against intrusion of water, sand or silt between the knob and the valve body into the chamber 46.

When the diver makes preparation for a descent, he rotates the knob 80 in the direction of the arrow 108, whereupon cooperation of the pin 100 and groove 102 cause the knob, stem 72 and sealing plate 74 to move axially inwardly to bring the sealing plate into confining relation with the check valve element 40, and the slots 94 of the knob out of registration with the slots 96 of the valve body. This is the closed or non-venting state of the valve 10. The knob and sealing plate are held in their just described positions by the detent action of the ball 104 and the cooperating depression 106 in the groove. As the diver descends he increases air pressure within the suit to balance the increasing ambient pressures and maintain the mentioned insulating layer of air. In the event his rate of descent momentarily exceeds the rate at which pressure in the body portion of the suit is increased, the sealing plate 74 protects the flexible rubber check valve element 40 from being forced inwardly through the passages 32.

When the diver desires to make an ascent, he rotates the knob 80 in the direction of the arrow 107 until the ball 104 engages the detent depression at the other end of the groove 102, in which position the sealing plate 74 is retracted from the check valve element 40 and the slots 94, 96 are in registration. This is the open or venting state of the valve 10. During the initial movement of the sealing plate 74 away from the valve element 40, the second check valve element 64 allows fluid flow from the cavity 46 through the passages 58, as necessary to prevent a possible hydraulic lock that would operate to prevent retracting of the sealing plate.

Initial flow through the valve 10, as it is being opened with an excess pressure in the suit relative to ambient pressures at the level of the valve, is through the inlet cavity 28, the passages 32, past the valve element 40 into chamber 46, through the passages 58, past the check valve 64 into the cavity 90, and thence through the openings 88 to the ambient water medium. As rotation of the knob 80 continues and the ports or slots 94, 96 begin to come into registration, the flow of excess air exits chamber 46 via those slots. When the excess air has been exhausted and the pressure in the thermally insulating layer is substantially the same as the ambient water pressure, the check valve element 40 will close against its seat 34, venting will cease, and water will be prevented from entering. Thereupon the diver can rotate the knob 80 to its closed position, further sealing the valve against water intrusion or venting.

The knob 80 may, if desired under some circumstances, be left in an intermediate position wherein the slots 94, 96 are out of registration yet the sealing plate 74 is sufficiently retracted to permit operation of the check valve element 40. In this condition, the valve 10 operates as a dual or series check valve, with the secondary check valve element 64 operating in series with the check valve element 40. An additional detent depression can be incorporated in the groove 102 for yieldably detaining the knob in the intermediate position and providing the diver with a tactile indication of such.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A valve for controlling venting of air from a diver's suit of the type wherein a thermally insulating layer of air is maintained in the body portion of the suit, said valve comprising:

a substantially hollow valve body having defined therein a first cavity in communication with said layer of air in said suit;

a second cavity defined in said valve body;

a first interior wall extending transversely of said valve body between said first and second cavities, said wall having first means for flow of air from said first cavity to said second cavity;

a resiliently flexible first check valve element, cooperative with said first passage means, for permitting fluid flow from said first cavity to said second cavity and for preventing fluid flow from said second cavity to said first cavity;

a second interior wall extending transversely of said valve body in spaced relation to said first interior wall with said second cavity therebetween, said second interior wall having second passage means for flow of air from said second cavity;

a second check valve element, cooperative with said second passage means, for permitting fluid flow from said second cavity through said second passage means to an ambient fluid zone and for preventing fluid flow into said second cavity through said second passage means; and a sealing plate disposed between said first and second interior walls and movable into and out of confining relation with said first check valve element, whereby when in said confining relation said first check valve seals said first passage means against fluid flow therethrough into or out of said first cavity.

2. A valve as defined in claim 1, and further comprising:

guide means on said second interior wall;

stem means, cooperable with said guide means, for supporting and moving said sealing plate; and means, connected to said stem means, for manually effecting said movement.

3. A valve as defined in claim 2, and wherein said means connected to said stem means comprises a substantially hollow knob element having a side wall portion encompassing an outer wall portion of said valve body and guided for rotational and axial movement relative thereto.

4. A valve as defined in claim 3, and wherein:

said valve body is characterized by first port means defined in said outer wall portion thereof;

said knob element is characterized by second port means defined in said side wall portion;

said second port means being moved into registration with said first port means when said knob element is operated to a first predetermined operative position to move said sealing plate out of said confining relation with said first check valve element, and said second port means being moved out of registration with said first port means when said knob element is operated to a second predetermined operative position to move said sealing plate into said confining relation with said first check valve element.

5. A valve as defined in claim 4, and wherein:

said knob element and said second interior wall define a third cavity, said knob element having openings therethrough for free communication between ambient fluid externally thereof and said ambient fluid zone interiorly thereof.

6. A valve as defined in claim 5 and further comprising:

a guide pin and a helical guide groove interconnecting said knob element and valve body and cooperable upon manual rotation of said knob element to effect said axial movements thereof and said movements of said sealing plate.

7. A valve as defined in claim 6, and further comprising detent means for releasably holding said knob element in said first and second predetermined operative positions.

8. A valve as defined in claim 7, and further comprising:

sliding seal means, carried by said knob element, for effecting a seal between said side wall portion of said knob element and said valve body when said knob element is in said second predetermined operative position and said first and second port means are out of registration.

9. A diver's suit exhaust valve comprising:

a valve body;

an inlet cavity defined in said valve body and adapted to communicate with the interior of a diver's suit;

first and second valve elements housed in spaced, series relation in said body;

a first outlet cavity defined in said valve body between said first and second check valve elements;

first outlet port means defined in said body for communication between said first outlet cavity and the exterior of said body;

a knob member mounted on said valve body for movement between at least first and second operative positions and through an intermediate position, said knob member defining with said valve body a second outlet cavity;

second outlet port means defined in said knob member for communication between said second outlet cavity and the exterior of said valve;

third outlet port means defined in said knob member and movable into and out of registration with said first outlet port means in accordance with said first and second operative positions of said knob member; and a check valve sealing member disposed in said first oulet cavity and movable into and out of confining relation with said first check valve element in response to movement of said knob member between said first and second operative positions.

10. A diver's suit exhaust valve as defined in claim 9, and further comprising:

first guide means carried by said body for supporting and guiding said check valve sealing member for axial movement toward and from said first check valve element.

11. A diver's suit exhaust valve as defined in claim 10, and further comprising:

second guide means, cooperating between said body and said knob member, for effecting said axial movement in response to rotation of said knob relative to said body.

12. A diver's suit exhaust valve as defined in claim 11, and further comprising:

detent means for yieldably retaining said knob member in selected ones of said operative positions.

* * * * *